US011509717B2

(12) United States Patent
Gupta et al.

(10) Patent No.: US 11,509,717 B2
(45) Date of Patent: Nov. 22, 2022

(54) CROSS DATACENTER READ-WRITE CONSISTENCY IN A DISTRIBUTED CLOUD COMPUTING PLATFORM

(71) Applicant: Microsoft Technology Licensing, LLC, Redmond, WA (US)

(72) Inventors: Shashwat Gupta, Bothell, WA (US); Chen Yang, Redmond, WA (US); Raman Nagaraj Chikkamagalur, Sammamish, WA (US); Maththondage Chamara S. Ranasingha, Sammamish, WA (US); Ayse Nil Onalan, Kirkland, WA (US); Ashutosh Agarwal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 90 days.

(21) Appl. No.: 16/683,121

(22) Filed: Nov. 13, 2019

(65) Prior Publication Data

US 2021/0144206 A1 May 13, 2021

(51) Int. Cl.
*H04L 67/1097* (2022.01)
*H04L 67/1023* (2022.01)
*H04L 67/563* (2022.01)

(52) U.S. Cl.
CPC ...... *H04L 67/1097* (2013.01); *H04L 67/1023* (2013.01); *H04L 67/563* (2022.05)

(58) Field of Classification Search
CPC ............. H04L 67/1023; H04L 67/1097; H04L 67/2814
See application file for complete search history.

(56) References Cited

U.S. PATENT DOCUMENTS

| 9,697,224 | B1* | 7/2017 | Factor ................. G06F 16/1748 |
| 10,235,333 | B1 | 3/2019 | Schuller et al. |
| 2007/0282915 | A1 | 12/2007 | Vosshall et al. |
| 2009/0285120 | A1* | 11/2009 | Swan ...................... H04L 41/12 370/254 |

(Continued)

OTHER PUBLICATIONS

"International Search Report and Written Opinion Issued in PCT Application No. PCT/US20/059764", dated Mar. 1, 2021, 11 Pages.

(Continued)

*Primary Examiner* — Thomas J Dailey
(74) *Attorney, Agent, or Firm* — Fiala & Weaver P.L.L.C.

(57) ABSTRACT

A distributed storage system including a server is configured to accept a request including a consistency indicator that flags for the server that cross datacenter consistency is desired. The server may be required to detect the consistency indicator and in response, to determine a consistency key based at least in part on the request. In an example aspect, the consistency key may comprise a hash value determined by a hash function shared across datacenters, whereby every datacenter may determine the same consistency key for a given resource and datacenter combination. The server may be further configured to determine a preferred datacenter for handling the request based at least in part on the consistency key, and thereafter to redirect the request to the preferred datacenter. In embodiments, the consistency indicator may also denote a scope of the strong consistency required by the calling client.

20 Claims, 7 Drawing Sheets

(56) References Cited

U.S. PATENT DOCUMENTS

| | | | | |
|---|---|---|---|---|
| 2011/0286594 | A1* | 11/2011 | Resch | G06F 11/10 |
| | | | | 380/46 |
| 2012/0095971 | A1* | 4/2012 | Shyam | G06F 16/1774 |
| | | | | 707/690 |
| 2013/0325820 | A1* | 12/2013 | Grube | G06F 16/2365 |
| | | | | 707/691 |
| 2014/0101298 | A1 | 4/2014 | Shukla et al. | |
| 2017/0054802 | A1* | 2/2017 | Annamalai | G06F 16/248 |

OTHER PUBLICATIONS

Shukla, Dharma, "A technical overview of Azure Cosmos DB", Retrieved From:https://azure.microsoft.com/en-us/blog/a-technical-overview-of-azure-cosmos-db/, May 10, 2017, 12 Pages.

* cited by examiner

500

| Determining a hash value from a hash function based at least in part on a consistency indicator, each datacenter of a plurality of datacenters using the same hash function for determining a consistency key. | 502 |

FIG. 5

CROSS DATACENTER READ-WRITE CONSISTENCY IN A DISTRIBUTED CLOUD COMPUTING PLATFORM

BACKGROUND

Cloud computing refers to the on-demand availability of computer system resources, especially data storage and computing power typically provided in geographically dispersed datacenters, over the Internet without direct active management by the user. Modern cloud computing has many qualities, perhaps none more important than high availability. Businesses in particular utilize cloud computing platforms for many mission critical applications including, e-commerce and data warehousing applications. For many applications, any period of system unavailability can be very expensive to system users. Accordingly, cloud computing platforms typically make extensive use of redundancy within each datacenter, as well as geographic redundancy whereby additional redundant datacenters are distributed about the globe. Such redundancies involve both hardware and data redundancy, the latter of which involves distribution of resource replicas between geographically diverse datacenters.

Such replication and distribution of resource replicas between datacenters is not, however, always a fast process. Transaction data, for example, and other data that underly business applications may be quite voluminous, and/or may change rapidly. In such instances, it can be difficult to ensure that data is consistent across diverse datacenters.

Business applications may, however, require and assume that a consistent view of data resources is always available, and that the data written by one client is always provided to that or other clients during subsequent read of that data. Current approaches to this problem are often inadequate. For example, cloud computing platforms may support 'eventual consistency' whereby written data is eventually consistent across datacenters (i.e., after background replication completes). Alternatively, consistent views of data may be provided to clients that connect to the same datacenter (i.e., the datacenter to which the data is written initially). In yet another example, where a cloud computing platform provides session consistency, disparate clients may share a session. The first solution is not timely, and the second is of little use to a client that is connected to a different datacenter. According to the last solution, session data is shared between clients that may be widely distributed throughout the world.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and computer program products are provided for providing cross datacenter consistency in a global system including multiple geographically diverse datacenters. In an example aspect, a server in a datacenter may receive a request for a resource. The request contains a consistency indicator. The server detects the consistency indicator in the request and determines a consistency key based at least in part on the request (or information related to the request such as, for example, access or authorization token, or authorization context). A preferred datacenter for fulfilling the request is determined based on the consistency key. The request is redirected to that datacenter.

In a further example aspect, the datacenter server is configured to determine the consistency key based at least in part on the request by determining a hash value with regard to the request. In an aspect, every datacenter may use the same hash function for determining a consistency key, and the preferred datacenter is determined each time a consistency indicator is detected in a request. In a further example aspect, the preferred datacenter is determined in a datacenter frontend, and the request is redirected to the preferred datacenter via binding redirection.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

FIG. 5 depicts a flowchart of a refinement to the flowchart of FIG. 4 including use of a shared hash function, according to an embodiment.

Figure 1:
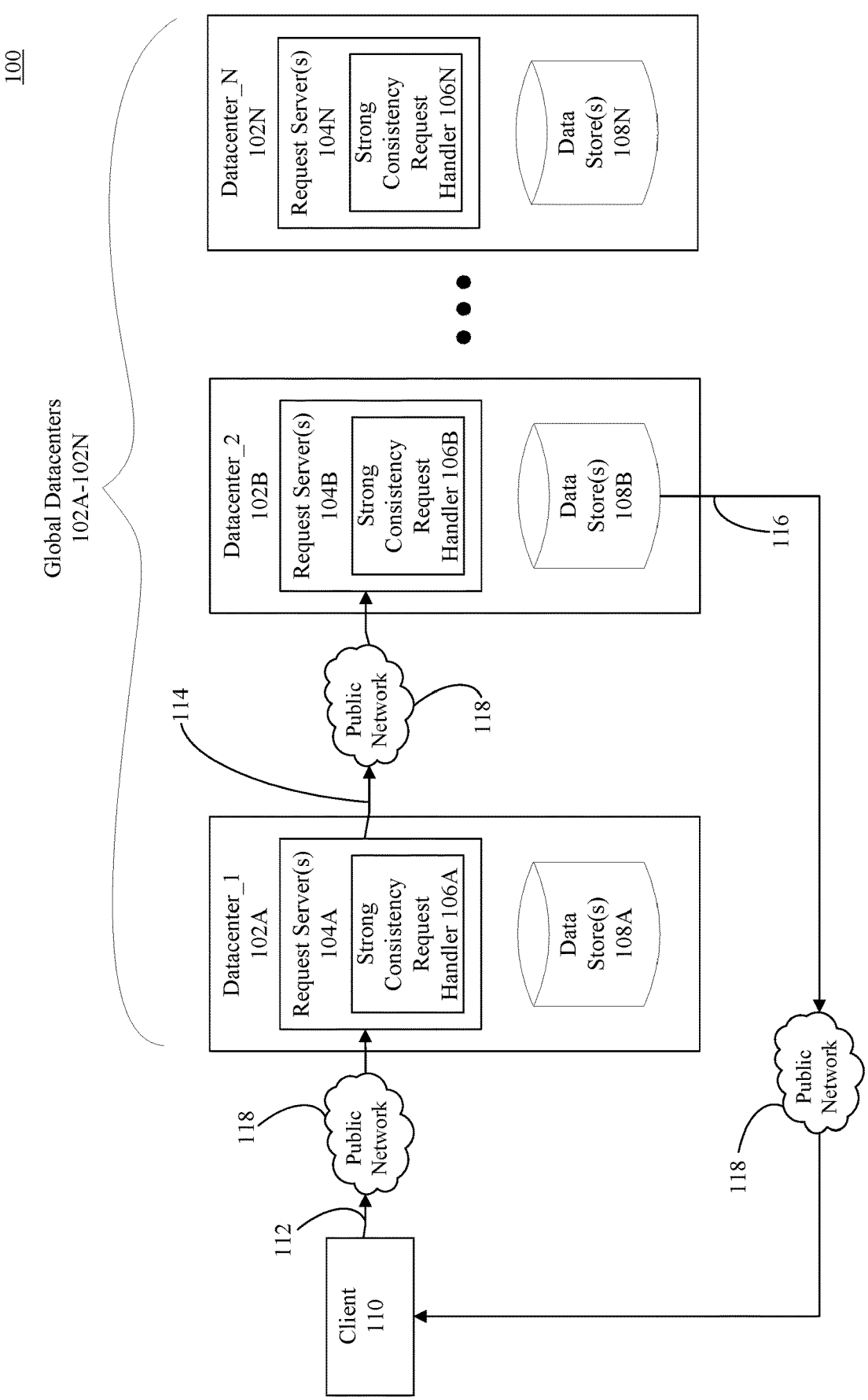
FIG. 1 depicts a block diagram of an example distributed storage system comprising a plurality of datacenters including request servers with strong consistency request handlers, according to an embodiment.

The features and advantages of embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As mentioned above, highly available distributed computing systems generally extensively use multiple redundancy within the same datacenter as well as geo-redundancy across datacenters (i.e., additional datacenters in geographically disparate locations). For example, Microsoft Azure Active Directory (hereinafter "AAD") is a highly available, distributed system that enables secure management of access to Azure cloud computing services and resources. AAD ensures high availability and scalable performance by replicating data across disparate datacenters. In particular, a write to AAD goes to a datacenter hosting a primary replica of the written data, with such writes being synchronously replicated to a secondary datacenter that hosts a copy of the primary replica. Afterward, the data is asynchronously replicated to multiple other datacenters that each host a secondary replica of the data. Subsequent reads of the written AAD data are serviced from the datacenters hosting the secondary replicas.

Because AAD reads pull data from secondary replicas, it is possible that due to replication delay between primary and secondary datacenters that a client does not see a consistent view. This problem is partially addressed through a session consistency mechanism whereby a client is provided with a "replica token" that may be used for multiple operations during the same logical session, thereby preserving read-write consistency. However, preserving session consistency between different clients requires clients to pass the replica token to one another. For example, suppose clients A, B and C add a new user, then client D's application needs to see all three new users. Under this scenario, client A creates its user and passes the replica token client B, and then B in turn passes it to client C, and then eventually must be passed to client D. Though feasible, such a consistency mechanism is not very convenient for clients.

To address these shortcomings, a naïve solution that would ensure strong consistency could require that all writes to a particular replica be synchronously replicated to every other replica. However, a distributed system cannot be both "strongly consistent" and "highly available" at the same time. Synchronous replication of this variety does not scale, and performance would suffer tremendously. Nevertheless, complex application scenarios may require cross datacenter consistency.

Accordingly, embodiments disclosed herein permit a client to enforce strong consistency and accept the trade-off that the system may be less available and have lower performance. Embodiments permit a user to optionally require strong consistency during a write such that a subsequent read call across regions and identities has visibility to that write.

To accomplish this goal, embodiments enable datacenters to independently determine which datacenter should receive a write and any subsequent read of a resource by including an optional strong consistency indicator in the read or write request. When a datacenter receives a request that includes a consistency indicator, the datacenter 1) detects that indicator, 2) determines which datacenter should handle the request, and 3) redirects the request to that datacenter.

Embodiments for providing consistent data views in the above manner may be implemented in various ways. For instance, FIG. 1 depicts a block diagram of an example distributed storage system 100 comprising a plurality of global datacenters 102A-102N, and a client 110 that are communicatively coupled by a public network 118. Each of datacenters 102A-102N includes a respective one of request servers 104A-104N, which each include a corresponding one of strong consistency request handlers 106A-106N (also referred to as "consistency request handlers"). Each datacenter 102A-102N further includes a respective one of data stores 108A-108N. Other structural and operational embodiments will be apparent to person skilled in the relevant art(s) based on the following discussion regarding distributed storage system 100 as depicted in FIG. 1.

Public network 118 is a publicly accessible network over which any number of computing devices (only client 110 shown in FIG. 1 for brevity) can access applications of datacenters 102A-102N. For example, a request 112 may be received by request server 104A of datacenter 102A from client 110 over public network 118. Any number of clients 110 may be present, including numbers in the ones, tens, hundreds, millions, and even greater numbers. In an embodiment, distributed storage system 100 may comprise a networked system of multiple computers and/or processors, including tens, hundreds, thousands, and even greater numbers of computers and/or processors.

Client 110 may be any type of computing device, mobile or stationary, such a desktop computer, a server, a video game console, etc. Examples of client 110 include a mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as a Microsoft Windows® phone, an Apple iPhone, a phone implementing the Google® Android™ operating system, etc.), a wearable computing device (e.g., a head-mounted device including smart glasses such as Google® Glass™, Oculus Rift® by Oculus VR, LLC, etc.), a stationary computing device such as a desktop computer or PC (personal computer), a gaming console/system (e.g., Microsoft Xbox®, Sony PlayStation®, Nintendo Wii® or Switch®, etc.), etc.

Public network 118 may comprise one or more networks such as local area networks (LANs), wide area networks (WANs), enterprise networks, and may include one or more of wired and/or wireless portions. In an embodiment, public network 118 includes the Internet.

Although request servers 104A-104N are depicted as monolithic components within each of datacenters 102A-102N, request servers 104A-104N may be embodied in any number of computing devices including servers, and may include any type and number of other resources, including resources that facilitate communications with and between computing devices connected via public network 118. In embodiments, servers implementing request servers 104A-104N of datacenters 102A-102N may be organized in any manner, including being grouped in server racks (e.g., 8-40 servers per rack, referred to as nodes or "blade servers"), server clusters (e.g., 2-64 servers, 4-8 racks, etc.), or larger collection (e.g., thousands of servers, hundreds of racks, dozens of clusters, etc.). In an embodiment, the servers request servers 104A-104N of datacenters 102A-102N may be co-located (e.g., housed in one or more buildings with associated components such as backup power supplies, redundant data communications, environmental controls, etc.), or may be arranged in other manners.

It should be understood that although request servers 104A-104N are configured to receive and handle requests, in other embodiments, request servers 104A-104N may also be configured to host applications, including web applications, and thus may implement a web site, web server, web service, and/or other transaction handling application. It should also be understood, that embodiments of datacenters 102A-102N and/or request servers 104A-104N may also comprise collections of logical compute resources that may or may not be physically distributed in the ordinary sense.

As shown in FIG. 1, each of datacenters 102A-102N further includes a respective one of data stores 108A-108N. Data stores 108A-108N may include one or more of any type of storage mechanism for storing data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of storage medium.

The data stored within data stores 108A-108N may be organized in virtually any fashion including, for example, in the tables of a relational database, as nodes of a graph database, a hierarchical database or other types of databases. Furthermore, although depicted in FIG. 1 as monolithic components, it should be understood that each of data store 108A-108N may comprise multiple storage media and attendant hardware, and may be organized as multiple databases whether collocated or distributed. The general operation of an embodiment of distributed storage system 100 is further described as follows.

As described above, client 110 may transmit request 112 to a datacenter, such as datacenter 102A, as depicted in FIG. 1. As is described in further detail below, client 110 may first connect to a gateway (not shown) that is responsible for determining which of datacenters 102A-102N the request should be routed to, as known in the art. If client 110 wishes to be provided with guaranteed data consistency ensuring return of the current view of the requested resource, client 110 may include in request 112 an optional consistency indicator (e.g., a flag(s), setting, attribute, or other type of parameter). Such an indicator may indicate to request server 104A of datacenter 102A not only that client 110 is requesting a consistent view of the requested resource, but as is described in greater detail below, may also specify other aspects of the consistent data request such as the scope of the requested consistency.

In an embodiment, strong consistency request handler 106A of request server 104A may be configured to detect a consistency indicator, and thereafter determine the preferred datacenter for retrieval of the requested resource (i.e., the datacenter guaranteed to have a current view of the resource) and re-route the request to that datacenter. For example, as depicted in FIG. 1, strong consistency request handler 106A may determine that the resource requested in request 112 is present in datacenter 102B, and route a redirected request 114 to datacenter 102B through public network 118. Request server 104B of datacenter 102B thereafter retrieves (or causes to be retrieved) the requested resource from data store 108B, and returns resource 116 to client 110 via public network 118.

Figure 2:
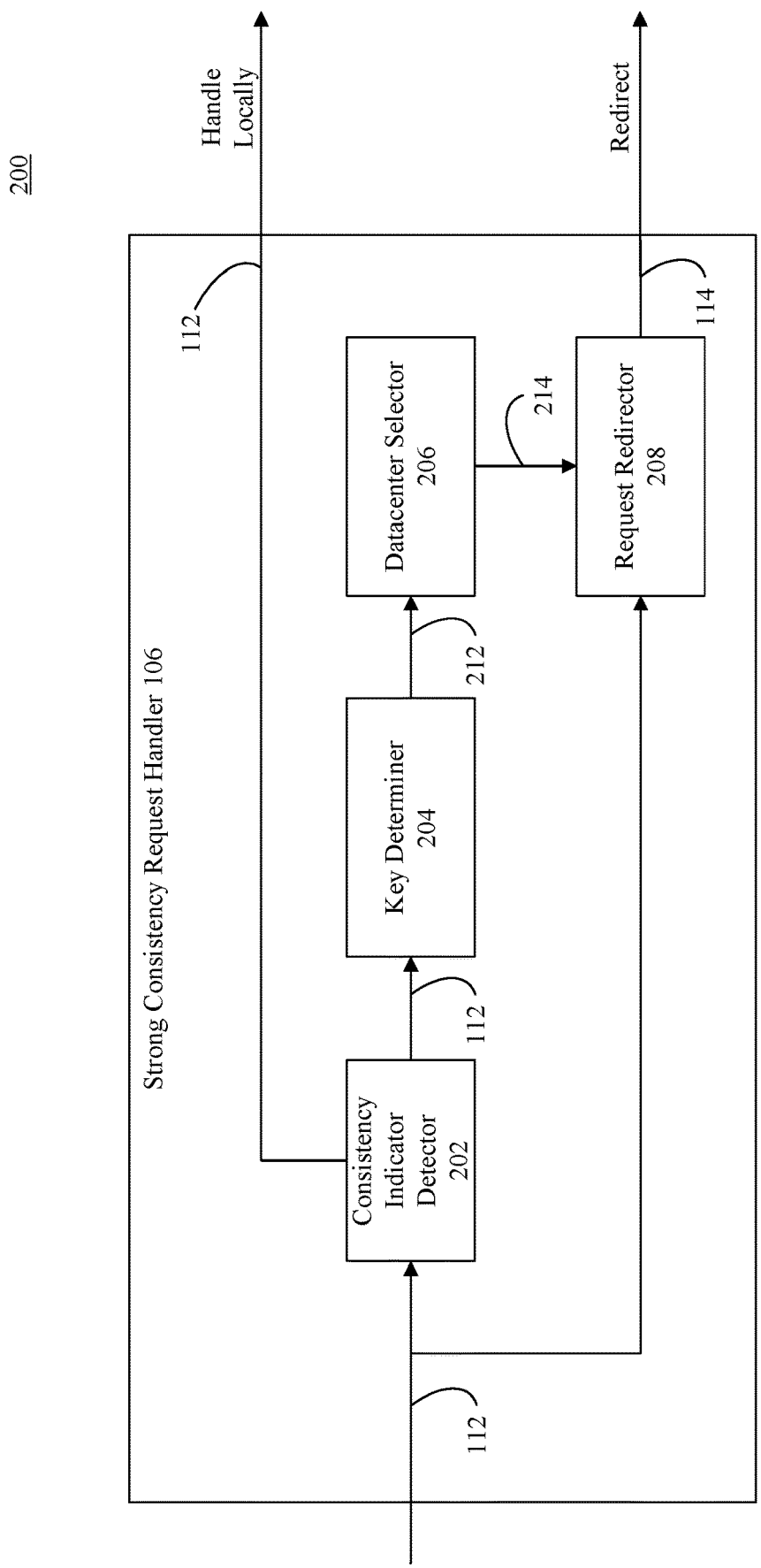
FIG. 2 depicts a detailed schematic view of an example strong consistency request handler, according to an embodiment.

Embodiments of strong consistency request handler 106 may be implemented in various ways. For instance, FIG. 2 depicts a detailed schematic view 200 of an example strong consistency request handler 106, according to an embodiment. Any one or more of strong consistency request handlers 106A-106N of FIG. 1 may be implemented according to strong consistency request handler 106 of FIG. 2. Strong consistency request handler 106 includes a consistency indicator detector 202, a key determiner 204, a datacenter selector 206 and a request redirector 208. Other structural and operational embodiments will be apparent to person skilled in the relevant art(s) based on the following discussion regarding strong consistency request handler 106 as depicted in FIG. 2.

As depicted in FIG. 2, consistency indicator detector 202 receives the incoming request 112. Request 112 may be configured in various ways. As known in the art, for example, cloud computing storage solutions often expose an API (application programming interface) that is consumable by end user applications, and specify the number and type of parameters that may be passed in a read or write call. Alternatively, request 112 operate through a RESTful web service (i.e., a web service that conforms to the Representational State Transfer (REST) architecture), whereby a URI (uniform resource indicator) makes express reference to the resource being requested, and consistency related parameters (e.g., consistency indicators and/or scope parameters) may be specified as headers. For example, request 112 may take the form of an HTTP (hypertext transfer protocol) GET wherein the URI of the request refers to the requested resource, and the consistency header is incorporated into a header (or elsewhere).

As discussed above, such a consistency indicator may be included in request 112 where the caller wishes to receive a consistent view of the resource (i.e., the master copy). For example, request 112 may include a header denoted as ConsistencyLevel the presence of which may be detected by consistency indicator detector 202. In embodiments, the ConsistencyLevel header may be set to a number of values to govern the consistency level required by the caller. For example, a ConsistencyLevel header may be set to any of Application, User or Tenant to achieve different scopes of guaranteed consistency.

In an embodiment, strong consistency request handler 106 may be configured to enforce consistency scoped to an Application level by providing cross-datacenter consistency to all calls by instances of the same application. Similarly, User scope provides cross-datacenter consistency to all calls by the same authenticated user regardless of which application that user may be employing to make the call. Finally, Tenant level scope provides cross-datacenter consistency to all calls from a particular tenant (or, equivalently, organization). Such consistency calls at the organization level may include calls from different users and/or applications, and therefore Application and/or User scope may in some situations be inadequate.

In an embodiment, it may be desirable to provide cross-datacenter consistency to only a subset of all calls scoped to a particular tenant/organization because unnecessary hot spots may be created. Moreover, providing global cross-datacenter consistency to all calls from an entire organization may encounter performance/scalability problems. Accordingly, embodiments may be further configured to detect a ScenarioID header in request 112 whenever the ConsistencyLevel header is set to Tenant, and provide cross-datacenter consistency only to calls related to a particular scenario as flagged by the included ScenarioID. In this fashion, cross-datacenter consistency may be achieved by multiple users and/or applications that have a need to share common data.

Returning now to the discussion of strong consistency request handler 106 as shown in FIG. 2, as described above, embodiments of consistency indicator detector 202 may be configured to detect a consistency indicator (e.g., ConsistencyLevel header) in request 112. Where no such consistency indicator is detected by consistency indicator detector 202, request 112 may be passed through strong consistency request handler 106 for ordinary request handling locally at the current datacenter, and without cross-datacenter consistency guarantees. Alternatively, when consistency indicator detector 202 detects a consistency indicator, request 112 is passed to both key determiner 204 and request redirector 208.

In embodiments, key determiner 204 is configured to determine consistency keys 212 based at least in part on request 112. As will be discussed in further detail below, embodiments may subsequently use consistency keys 212 at datacenter selector 206 to determine an appropriate datacenter to receive a redirected request. In embodiments, consistency keys 212 may comprise hash function values generated by a hash function that is shared between and common to all datacenters. In an embodiment, key determiner 204 may be configured to perform rendezvous hashing (i.e., highest random weight hashing). More specifically, key determiner 204 may be configured to compute hash values (i.e., a consistency keys 212) for each datacenter based on the identity of the resource being requested in request 112 (e.g., the resource URI). In embodiments, the determined consistency keys may each be weighted according to weights associated with each datacenter, thereby permitting resources to be assigned to datacenters based upon their respective capacities.

In an embodiment, consistency keys 212 are thereafter provided to datacenter selector 206 to determine a preferred datacenter 214 for fulfilling the request. For example, datacenter selector 206 may be configured to select the consistency key of consistency keys 212 having the highest weighted value, wherein the datacenter associated with the selected value is preferred datacenter 214. For example, datacenter selector 206 may maintain or access a data structure (e.g., an array, a table, a list, etc.) that contains an association of datacenters and consistency keys. In an embodiment, each datacenter may have a corresponding consistency key in the data structure. Data center selector 206 may search the data structure based on the selected consistency key of consistency keys 212 to determine the associated datacenter, which is preferred datacenter 214. In other embodiments, datacenter selector 206 may determine preferred datacenter 214 based on the selected constancy key in other manners. Preferred datacenter 214 is thereafter passed to request redirector 208.

In embodiments, request redirector 208 may be configured to accept request 112 as received by strong consistency request handler 106, and preferred datacenter 214 as determined by key determiner 204 and datacenter selector 206. Request redirector 208 may thereafter generate redirected request 114 which is transmitted to preferred datacenter 214 for handling. For example, request redirector 208 may maintain or access a data structure that indicates communication addresses (e.g., IP addresses, domain names, etc.) for datacenters to which redirected requests may be transmitted.

In an embodiment, redirected request 114 is a modified version of request 112 wherein the consistency indicator and any associated headers has been removed. When the redirected request 114 is subsequently received by preferred datacenter 214, the request will be handled in the ordinary fashion without strong consistency handling at that datacenter. By definition, however, preferred datacenter 214 possesses the master copy of the requested resource, and fulfillment of redirected request 114 by preferred datacenter 214 will satisfy the strong consistency requirement requested by client 110 in its original request 112.

Alternatively, redirected request 114 may be a copy of request 112 including all original headers, but being directed to preferred datacenter 214 for fulfillment. When redirected request 114 is subsequently received by preferred datacenter 214, the instance of strong consistency request handler 106 present in that datacenter may function as described above, detecting the consistency indicator present in the request, and thereafter determining a preferred datacenter through a rendezvous hashing algorithm. Of course, since the hash function used by each instance of key determiner 204 is the same (i.e., because the hash function is shared between all datacenters), the preferred datacenter is determined to be the current datacenter, and the request may be handled locally without a redirect. In another embodiment, preferred datacenter 214 may be configured to detect that redirected request 114 was, in fact, previously redirected and therefore handle the request locally. Although examples and embodiments discussed herein typically refer to a read operation (e.g., HTTP GET), it should be understood that embodiments are configured to operate on write operations as well.

For example, suppose two clients we can call Client1 and Client2 have different authentication identities and using different applications wish to accomplish related tasks. For example, suppose the Client1's application is creating a new user or login identity, and Client2's client needs to make subsequent use of data related thereto. Further suppose that Client1 has close proximity to and connects with Datacenter1, whereas Client2 has close proximity to and connects with Datacenter2, and each of the respective read and write requests goes to the respective datacenters. Under these circumstances, when Client1 creates a new user with a cross datacenter requirement (i.e., by including a strong consistency indicator in the write request), embodiments operate in the general manner described above and determine the preferred datacenter for the write operation.

For example, where the preferred datacenter is determined to be Datacenter3, the write request(s) performed by User1 of associated new user/login resources will be redirected to Datacenter3 where such resources are ultimately stored, and the subsequent reads by Client2 at Datacenter2 will likewise be redirected to Datacenter3 for fulfillment in the general manner described above, and as described in more detail below. Embodiments of distributed storage system 100 and strong consistency request handlers 106 as depicted in FIGS. 1 and 2, respectively, will now be further described with reference to FIG. 3.

Figure 3:
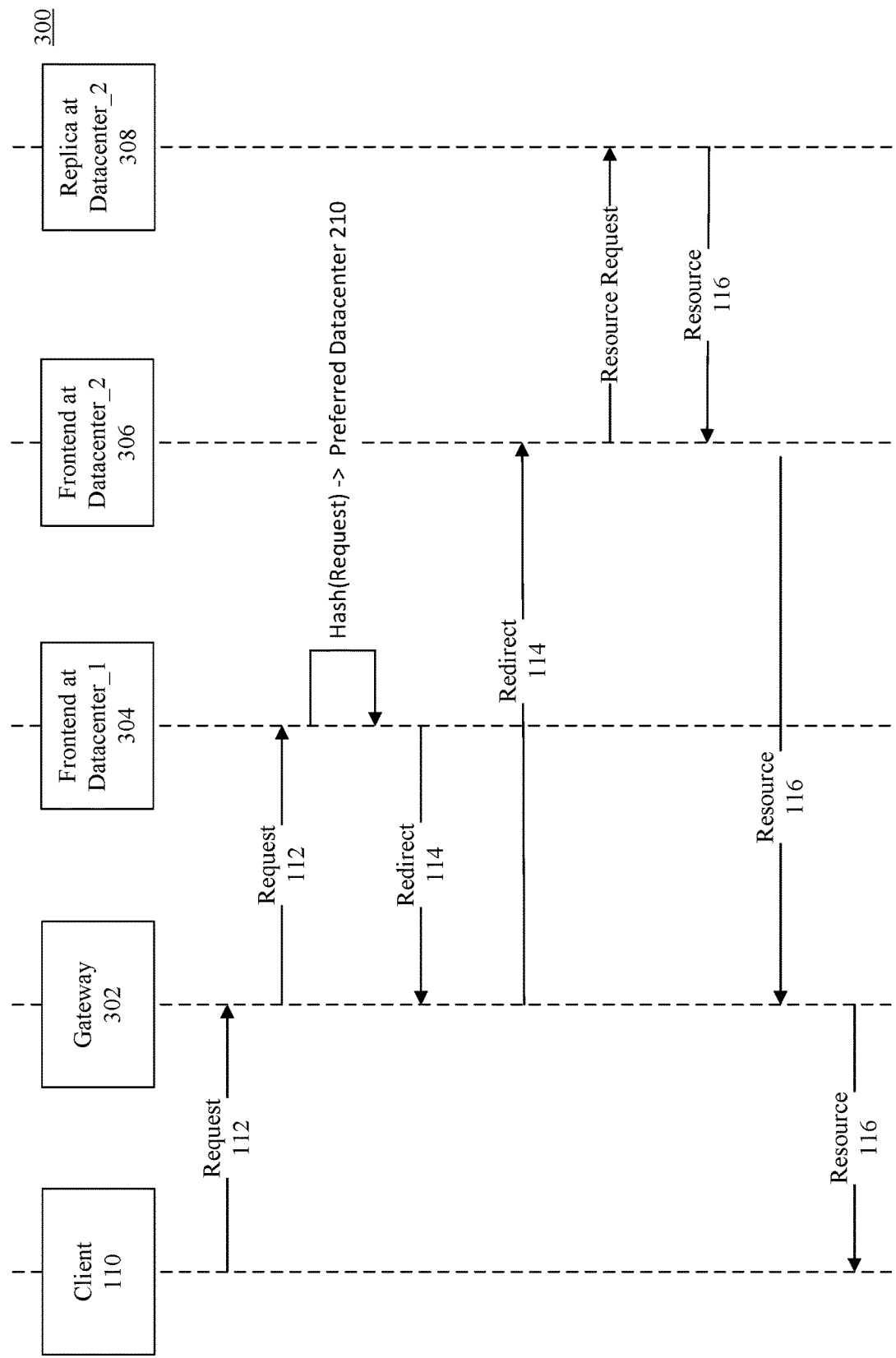
FIG. 3 depicts a sequence diagram illustrating the example distributed storage system of FIG. 1 satisfying a request that includes a strong consistency condition, according to an embodiment.

FIG. 3 depicts a sequence diagram 300 illustrating distributed storage system 100 of FIG. 1 satisfying a request 112 that includes a strong consistency requirement, according to an embodiment. Sequence diagram 300 is described with reference to FIGS. 1 and 2. However, other structural and operational embodiments will be apparent to persons skilled in the relevant art(s) based on the following discussion regarding sequence diagram 300 of FIG. 3.

Sequence diagram 300 satisfaction of a read request wherein cross datacenter consistency is required. Accordingly, it is assumed that the data being requested was previously written. Sequence diagram 300 begins in the upper left with request 112 being delivered to gateway 302. In an embodiment, request 112 may comprise an HTTP GET and resolution of the Request-URI points to Gateway 302. Gateway 302 determines datacenter of global datacenters 102A-102N should handle request 112.

In embodiments, gateway 302 may be configured to forward request 112 to the datacenter that is geographically closest to the location of client 110. A proximity-based approach such as this may be suitable if datacenters are properly distributed to achieve good load balance. In alternative embodiments, however, gateway 302 may forward request 112 to another datacenter based on other criteria as known in the art.

In the example shown in sequence diagram 300, gateway 302 forwards request 112 to datacenter_1 102A of FIG. 1. As shown in FIG. 3, a frontend at datacenter_1 304 receives request 112. In an embodiment, frontend 304 may itself comprise request server 104A as shown in FIG. 1. Alternatively, frontend 304 may forward the request to another backend server. Assuming the former scenario, strong consistency request handler 106A receives request 112 and determines preferred datacenter 210 in the general manner described above. After determining the preferred datacenter, frontend 304 may send the redirected request 114 back to gateway 302. In an embodiment, the redirected request 114 is routed back to gateway 302 using binding redirect.

Upon receipt of redirected request 114, gateway 302 transmits the request to the preferred datacenter (i.e., a datacenter known to house an always consistent replica of the requested resource). In this example, the redirected request 114 lands at frontend 306 of datacenter_2.

As described above, frontend 306 may be configured to handle the request itself or, more typically, handoff the request to a backend server for fulfillment. Sequence diagram 300 of FIG. 3 depicts the former wherein the resource requested in redirected request 114 is retrieved from replica 308 (i.e. storage), and returned to frontend 306 as resource 116. Resource 116 is thereafter bubbled back up through the hierarchy until delivered to client 110.

Figure 4:
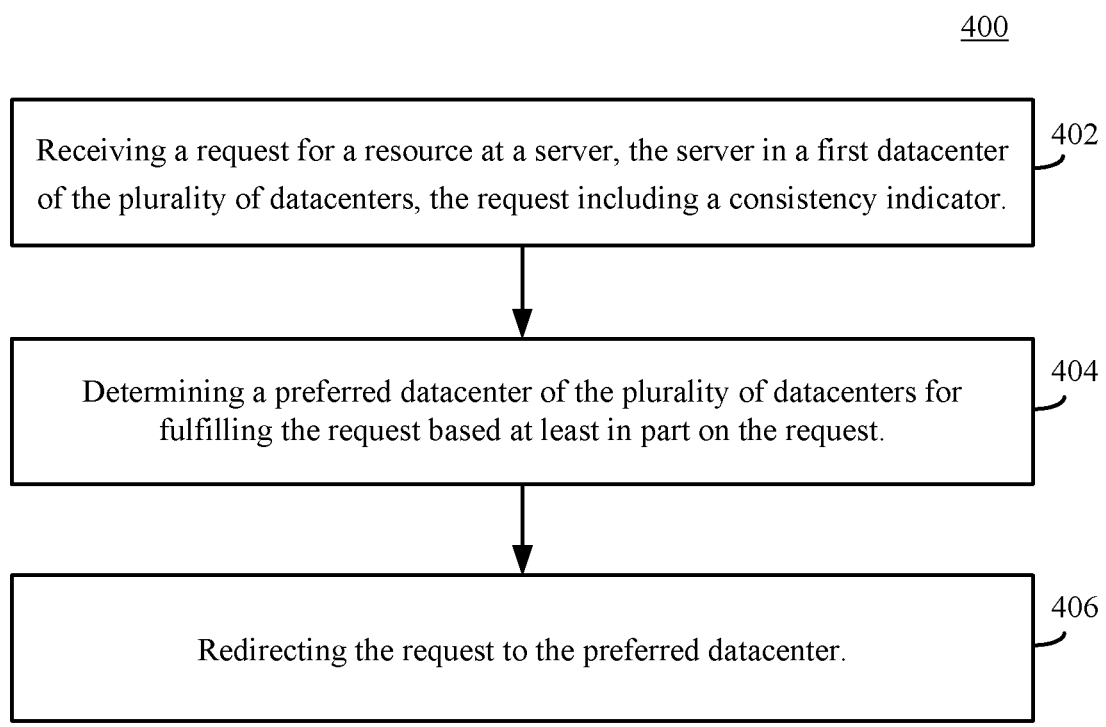
FIG. 4 depicts a flowchart of an example method for satisfying a resource request including a strong consistency condition, according to an embodiment.

Further operational aspects of distributed storage system 100 of FIG. 1 and strong consistency request handler 106 of as depicted in FIG. 2, are described as follows in conjunction with FIG. 4. FIG. 4 depicts a flowchart 400 of an example method satisfying a resource request including a strong consistency requirement, according to an embodiment. Flowchart 400 is described with continued reference to FIGS. 1 and 2. However, other structural and operational embodiments will be apparent to persons skilled in the relevant art(s) based on the following discussion regarding flowchart 400 of FIG. 4 and distributed storage system 100 of FIG. 1.

Flowchart 400 begins at step 402. At step 402, a request for a resource is received at a server, the server housed in a first datacenter of a plurality of datacenters, the request including a consistency indicator. For example, and with reference to distributed storage system 100 as depicted in FIG. 1 and described above, request server 104A of datacenter_1 102A is configured to accept request 112 from client 110, wherein request 112 includes a consistency indicator as described above. Flowchart 400 of FIG. 4 continues at step 404.

At step 404, a preferred datacenter of the plurality of datacenters for fulfilling the request is determined based at least in part on the request. For example, and with continued reference to distributed storage system 100 and strong consistency request handler 106, key determiner 204 of strong consistency request handler 106 may be configured to determine a consistency key based in part on the request. In particular, key determiner 204 may be configured to compute hash values (i.e., consistency keys 212) for each datacenter based on the identity of the resource being requested in request 112 (e.g., the resource URI). Alternatively, key determiner 204 may be configured to compute consistency keys 212 based on some other portion of request 112 or other information that accompanies request 112 such as, for example, an access token or other authorization information.

Datacenter selector 206 may be configured to thereafter select the consistency key of consistency keys 212 having the highest weighted value, wherein the datacenter associated with the selected value is preferred datacenter 214. Alternatively, datacenter selector 206 may accept unweighted consistency keys 212 from key determiner 204 and apply datacenter predetermined weighting factors to each of consistency keys 212, and thereafter select the weighted consistency key having the highest weighted value, wherein the datacenter associated with the selected value is preferred datacenter 214. Flowchart 400 of FIG. 4 concludes at step 406.

At step 406, the request is redirected to the preferred datacenter. For example, and with continued reference to distributed storage system 100 and strong consistency request handler 106, request redirector 208 may be configured to accept request 112 as received by strong consistency request handler 106, and preferred datacenter 214 as determined by key determiner 204 and datacenter selector 206. Request redirector 208 may thereafter generate redirected request 114 which is transmitted to preferred datacenter 214 for handling.

In the foregoing discussion of steps 402-406 of flowchart 400, it should be understood that at times, such steps may be performed in a different order or even contemporaneously with other steps. Other operational embodiments will be apparent to persons skilled in the relevant art(s). Note also that the foregoing general description of the operation of distributed storage system 100 is provided for illustration only, and embodiments of distributed storage system 100 may comprise different hardware and/or software, and may operate in manners different than described above. Indeed, steps of flowchart 400 may be performed in various ways.

For example, FIG. 5 depicts a flowchart 500 a flowchart of a refinement to flowchart 400 of FIG. 4 including use of a shared hash function, according to an embodiment. Accordingly, flowchart 500 of FIG. 5 is described with continued reference to distributed storage system 100 of FIG. 1, and strong consistency request handler 106 of FIG. 2. However, other structural and operational embodiments will be apparent to persons skilled in the relevant art(s) based on the following discussion regarding flowchart 500.

Flowchart 500 begins at step 502. At step 502, a hash value is determined from a hash function based at least in part on a consistency indicator, each datacenter of a plurality of datacenters using the same hash function for determining a consistency key. For example, and with continued reference to distributed storage system 100 and strong consistency request handler 106, key determiner 204 of strong consistency request handler 106 may be configured to perform rendezvous hashing (i.e., highest random weight hashing) wherein the hash function employed by the algorithm is shared between, and identical on, each instance of strong consistency request handler 106 on each of global datacenters 102A-102N. In embodiments, consistency keys 212 determined by key determiner 204 are wholly or partly based on the hash values generated by the above described rendezvous hash function. In embodiments, key determiner 204 may be configured to determine consistency keys 212 only for datacenters that may, in fact, handle such requests. That is, for example, legal requirements of various localities may require data residency, and thus it may be per se unallowable for data to be stored outside the locality (e.g., the General Data Protection Regulation ("GDPR") of the European Union ("EU") requires personal data of EU subjects neither be stored in or pass through countries that do not have data protection regulations equivalent to the GDPR). Under such circumstances, embodiments may exclude certain datacenters for hashing purposes.

Figure 6:
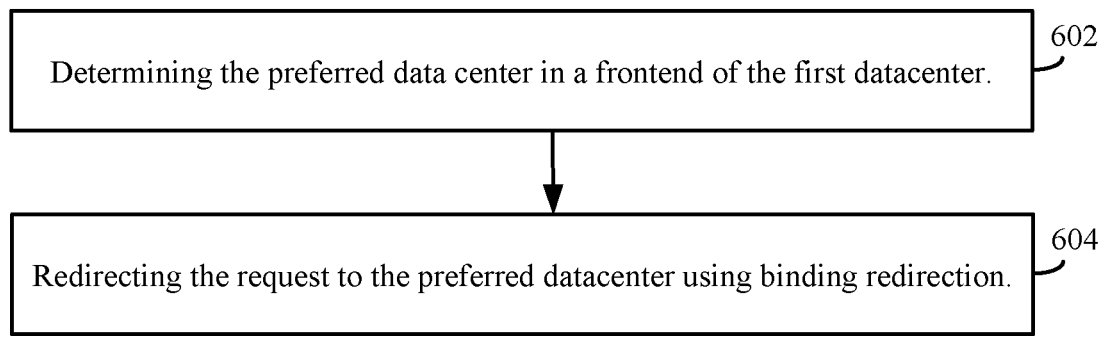
FIG. 6 depicts a flowchart of a refinement to the flowchart of FIG. 4 and/or FIG. 5 for redirecting requests to a preferred datacenter by binding redirection, according to an embodiment.

Steps of flowcharts 400 and/or 500 may be performed in additional ways. For example, FIG. 6 depicts a flowchart 600 for redirecting requests to a preferred datacenter by binding redirection, according to an embodiment, and wherein flowchart 600 comprises refinements or additions to the method steps of flowcharts 400 and/or 500 as depicted in FIGS. 4 and 5, respectively. Accordingly, flowchart 600 of FIG. 6 is described with continued reference to distributed storage system 100 of FIG. 1, and strong consistency request handler 106 of FIG. 2. However, other structural and operational embodiments will be apparent to persons skilled in the relevant art(s) based on the following discussion regarding flowchart 600.

Flowchart 600 begins at step 602. At step 602, the preferred data center is determined in a frontend of the first datacenter. For example, and with reference to sequence diagram 300 of FIG. 3 and its description above, as well as with continued reference to distributed storage system 100 of FIG. 1, and strong consistency request handler 106 of FIG. 2, request server 104A of datacenter_1 102A may itself comprise a frontend of the datacenter. Accordingly, the instance of strong consistency request handler 106 within request server 104A may determine preferred datacenter 214 as shown in FIG. 2, and perform binding redirection to redirect the request to the preferred datacenter as described above and illustrated in sequence diagram 300 of FIG. 3.

III. Example Computer System Implementation

Each of strong consistency request handler 106A-106N, consistency indicator detector 202, key determiner 204, datacenter selector 206 and/or request redirector 208, and flowcharts 400, 500, and/or 600 may be implemented in hardware, or hardware combined with software and/or firmware. For example, strong consistency request handler 106A-106N, consistency indicator detector 202, key determiner 204, datacenter selector 206 and/or request redirector 208, and flowcharts 400, 500, and/or 600 may be implemented as computer program code/instructions configured to be executed in one or more processors and stored in a computer readable storage medium. Alternatively, strong consistency request handler 106A-106N, consistency indicator detector 202, key determiner 204, datacenter selector 206 and/or request redirector 208, and flowcharts 400, 500, and/or 600 may be implemented as hardware logic/electrical circuitry.

For instance, in an embodiment, one or more, in any combination, of strong consistency request handler 106A-106N, consistency indicator detector 202, key determiner 204, datacenter selector 206 and/or request redirector 208, and flowcharts 400, 500, and/or 600 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
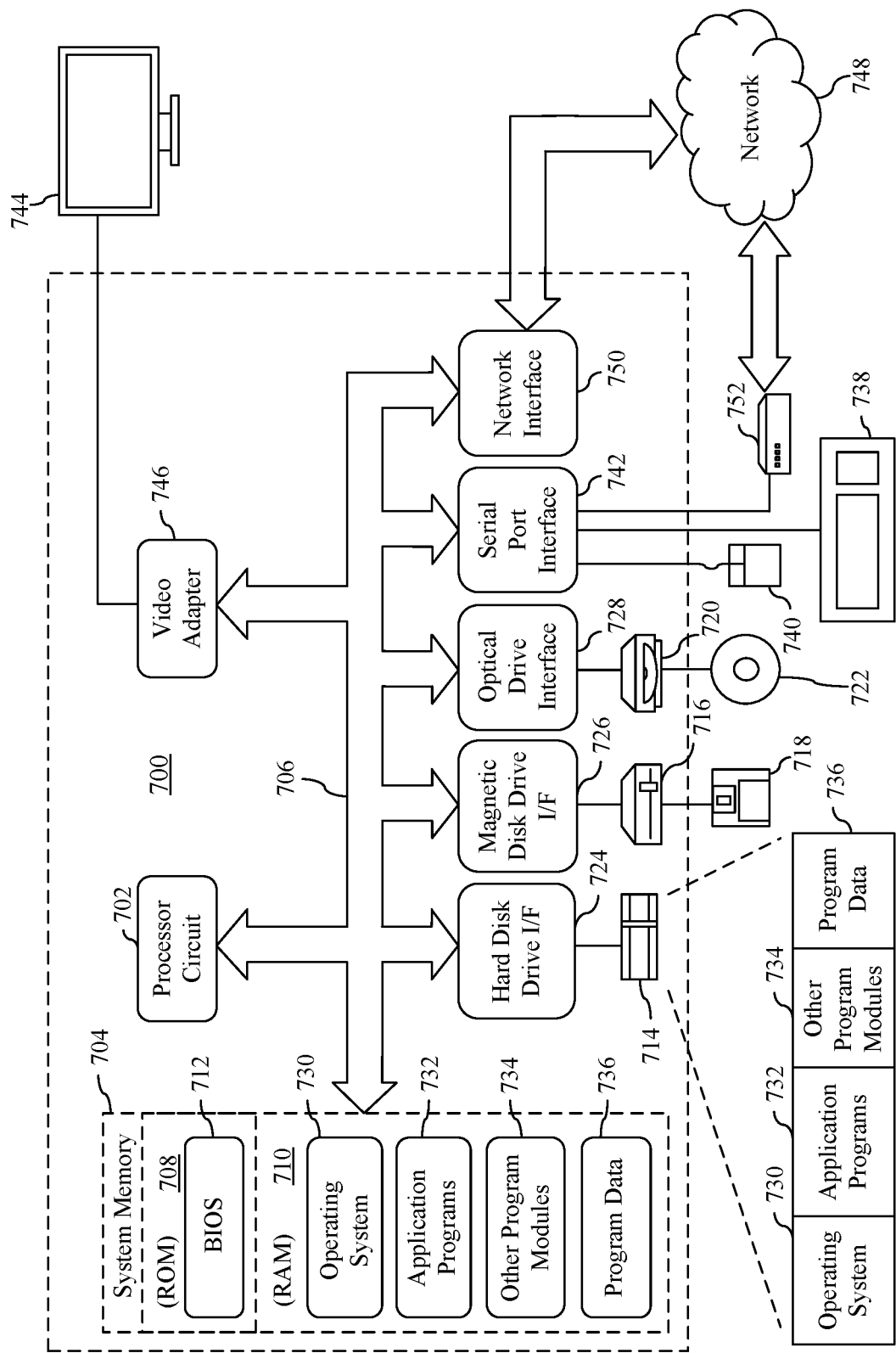
FIG. 7 is a block diagram of an example computer system in which embodiments may be implemented.

FIG. 7 depicts an exemplary implementation of a computing device 700 in which embodiments may be implemented. For example, client 110 and/or one or more servers of request server(s) 104A-104N may be implemented in one or more computing devices similar to computing device 700 in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing strong consistency request handler 106A-106N, consistency indicator detector 202, key determiner 204, datacenter selector 206 and/or request redirector 208, and flowcharts 400, 500, and/or 600 (including any suitable step of flowcharts 400, 500, and/or 600), and/or further embodiments described herein.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments described herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A distributed storage system in a server, the distributed storage system configured to provide a consistent view of a resource stored in at least one datacenter of a plurality of datacenters is provided herein. In an embodiment, the system comprises: a datacenter selector configured to determine a preferred datacenter of the plurality of datacenters for fulfilling a request for a resource based at least in part on the request, the request received at a first datacenter and including a consistency indicator; and a request redirector configured to redirect the request to the preferred datacenter.

In another embodiment of the foregoing system, the system further comprises: further comprises: a consistency indicator detector configured to receive the request and to detect the consistency indicator in the request; a key determiner configured to determine a consistency key based at least in part on the request; and wherein the datacenter selector is further configured to determine a preferred datacenter of the plurality of datacenters for fulfilling a request based at least in part on the consistency key.

In one embodiment of the foregoing system, the key determiner is configured to: determine a hash value from a hash function based at least in part on the request, each datacenter of the plurality of datacenters using the same hash function for determining a consistency key.

In an embodiment of the foregoing system, the datacenter selector is configured to determine the preferred datacenter every time a request includes a consistency indicator.

In one embodiment of the foregoing system, the datacenter selector is configured to determine the preferred data center in a frontend of the first datacenter; and the request redirector is configured to: redirect the request to the preferred datacenter using binding redirection.

In another embodiment of the foregoing system, the consistency indicator is scoped to at least one of an application, a user, or an organization.

In an embodiment of the foregoing system, the consistency indicator is scoped to an organization, and the consistency indicator further includes a scenario identifier.

A method for providing a consistent view of a resource stored in at least one datacenter of a plurality of datacenters is provided herein. The method comprising: receiving a request for the resource at the server, the server in a first datacenter of the plurality of datacenters, the request including a consistency indicator; determining a preferred datacenter of the plurality of datacenters for fulfilling the request based at least in part on the request; and redirecting the request to the preferred datacenter.

In an embodiment of the foregoing method, determining a preferred datacenter of the plurality of datacenters for fulfilling the request based at least in part on the request comprises: determining a consistency key based at least in part on the request; and determining the preferred datacenter based on the consistency key.

In another embodiment of the foregoing method, said determining a consistency key based at least in part on the request comprises: determining a hash value from a hash function based at least in part on the request, each datacenter of the plurality of datacenters using the same hash function for determining a consistency key.

In one embodiment of the foregoing method, the preferred datacenter is determined for every request that includes a consistency indicator.

In an embodiment of the foregoing method, the consistency indicator is scoped to at least one of an application, a user, or an organization.

In another embodiment of the foregoing method, determining a preferred data center comprises: determining the preferred data center in a frontend of the first datacenter; and wherein said redirecting the request to the preferred datacenter comprises: redirecting the request to the preferred datacenter using binding redirection.

In one embodiment of the foregoing method, wherein the consistency indicator is scoped to an organization, and the consistency indicator further includes a scenario identifier.

A computer-readable memory device is provided herein, the computer-readable memory device having computer program logic recorded thereon that when executed by at least one processor of a computing device causes the at least one processor to perform operations to provide a consistent view of a resource stored in at least one datacenter of a plurality of datacenters, the operations comprising: receiving a request for the resource in a first datacenter of the plurality of datacenters, the request including a consistency indicator; determining a preferred datacenter of the plurality of datacenters for fulfilling the request based on at least in part on the request; and redirecting the request to the preferred datacenter.

In an embodiment of the foregoing computer-readable memory device, determining a preferred datacenter of the plurality of datacenters for fulfilling the request based at least in part on the request comprises: determining a consistency key based at least in part on the request; and determining the preferred datacenter based on the consistency key.

In an embodiment of the foregoing computer-readable memory device, said determining a consistency key based at least in part on the request comprises: determining a hash value from a hash function based at least in part on the request, each datacenter of the plurality of datacenters using the same hash function for determining a consistency key.

In an embodiment of the foregoing computer-readable memory device, the preferred datacenter is determined for every request that includes a consistency indicator.

In an embodiment of the foregoing computer-readable memory device, said determining a preferred data center comprises: determining the preferred data center in a frontend of the first datacenter; and wherein said redirecting the request to the preferred datacenter comprises: redirecting the request to the preferred datacenter using binding redirection In an embodiment of the foregoing computer-readable memory device, the consistency indicator is scoped to one of an application, a user or an organization.

In an embodiment of the foregoing computer-readable memory device, the consistency indicator is scoped to an organization, and the consistency indicator further includes a scenario identifier.

V. Conclusion

While various embodiments of the disclosed subject matter have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method in a server for providing a consistent view of a resource stored in at least one datacenter of a plurality of datacenters, the method comprising:
receiving a request for the resource at the server, the server in a first datacenter of the plurality of datacenters, the request including a consistency indicator;
detecting the presence of the consistency indicator in the request, the consistency indicator comprising information that identifies one of a plurality of scopes of cross-datacenter consistency for the requested resource, each scope of cross-datacenter consistency indicative of a level that the requested resource is consistent across the plurality of data centers; and
in response to detecting the presence of the consistency indicator:
determining a consistency key based at least in part on the request;
determining a preferred datacenter of the plurality of datacenters for fulfilling the request based at least in part on the consistency key; and
redirecting the request to the preferred datacenter.

2. A method in a server for providing a consistent view of a resource stored in at least one datacenter of a plurality of datacenters, the method comprising:
receiving a request for the resource at the server, the server in a first datacenter of the plurality of datacenters, the request including a consistency indicator;
detecting the presence of the consistency indicator in the request; and
in response to detecting the presence of the consistency indicator:
determining a consistency key based at least in part on the request, said determining comprising determining a hash value from a hash function based at least in part on the request, each datacenter of the plurality of datacenters using the same hash function for determining the consistency key;

determining a preferred datacenter of the plurality of datacenters for fulfilling the request based at least in part on the consistency key; and redirecting the request to the preferred datacenter.

3. The method of claim 2, wherein the preferred datacenter is determined for every request that includes a consistency indicator.

4. The method of claim 1, wherein said determining a preferred data center comprises:

determining the preferred data center in a frontend of the first datacenter; and wherein said redirecting the request to the preferred datacenter comprises:

redirecting the request to the preferred datacenter using binding redirection.

5. The method of claim 1, wherein the consistency indicator is scoped to at least one of an application, a user, or an organization.

6. The method of claim 1, wherein the consistency indicator is scoped to an organization, and the consistency indicator further includes a scenario identifier.

7. A distributed storage system in a server, the distributed storage system configured to provide a consistent view of a resource stored in at least one datacenter of a plurality of datacenters, the distributed storage system comprising:

one or more processors; and one or more memory devices accessible to the one or more processors, the one or more memory devices storing program code configured to be executed by the one or more processor to perform operations, the operations comprising:

receiving a request for the resource at the server, the request including a consistency indicator;

detecting the presence of the consistency indicator in the request, the consistency indicator comprising information that identifies one of a plurality of scopes of cross-datacenter consistency for the requested resource, each scope of cross-datacenter consistency indicative of a level that the requested resource is consistent across the plurality of data centers; and in response to detecting the presence of the consistency indicator:

determining a consistency key based at least in part on the request;

determining a preferred datacenter of the plurality of datacenters for fulfilling a request for a resource based at least in part on the consistency key; and redirecting the request to the preferred datacenter.

8. A distributed storage system in a server, the distributed storage system configured to provide a consistent view of a resource stored in at least one datacenter of a plurality of datacenters, the distributed storage system comprising:

one or more processors; and one or more memory devices accessible to the one or more processors, the one or more memory devices storing program code configured to be executed by the one or more processor to perform operations, the operations comprising:

receiving a request for the resource at the server, the request including a consistency indicator;

detecting the presence of the consistency indicator in the request; and in response to detecting the presence of the consistency indicator:

determining a consistency key based at least in part on the request, said determining comprising determining a hash value from a hash function based at least in part on the request, each datacenter of the plurality of datacenters using the same hash function for determining the consistency key;

determining a preferred datacenter of the plurality of datacenters for fulfilling a request for a resource based at least in part on the consistency key; and redirecting the request to the preferred datacenter.

9. The distributed storage system of claim 7, wherein the operations further comprise:

determining the preferred data center in a frontend of the first datacenter; and redirecting the request to the preferred datacenter using binding redirection.

10. The distributed storage system of claim 7, wherein the consistency indicator is scoped to at least one of an application, a user, or an organization.

11. The distributed storage system of claim 7, wherein the consistency indicator is scoped to an organization, and the consistency indicator further includes a scenario identifier.

12. A computer-readable memory device having computer program logic recorded thereon that when executed by at least one processor of a computing device causes the at least one processor to perform operations to provide a consistent view of a resource stored in at least one datacenter of a plurality of datacenters, the operations comprising:

receiving a request for the resource in a first datacenter of the plurality of datacenters, the request including a consistency indicator;

detecting the presence of the consistency indicator in the request, the consistency indicator comprising information that identifies one of a plurality of scopes of cross-datacenter consistency for the requested resource, each scope of cross-datacenter consistency indicative of a level that the requested resource is consistent across the plurality of data centers; and in response to detecting the presence of the consistency indicator:

determining a consistency key based at least in part on the request;

determining a preferred datacenter of the plurality of datacenters for fulfilling the request based on at least in part on the consistency key; and redirecting the request to the preferred datacenter.

13. A computer-readable memory device having computer program logic recorded thereon that when executed by at least one processor of a computing device causes the at least one processor to perform operations to provide a consistent view of a resource stored in at least one datacenter of a plurality of datacenters, the operations comprising:

receiving a request for the resource in a first datacenter of the plurality of datacenters, the request including a consistency indicator;

detecting the presence of the consistency indicator in the request; and in response to detecting the presence of the consistency indicator:

determining a consistency key based at least in part on the request, the determining comprising determining a hash value from a hash function based at least in part on the request, each datacenter of the plurality of datacenters using the same hash function for determining the consistency key;

determining a preferred datacenter of the plurality of datacenters for fulfilling the request based on at least in part on the consistency key; and redirecting the request to the preferred datacenter.

14. The computer-readable memory device of claim 12, wherein the preferred datacenter is determined for every request that includes a consistency indicator.

15. The computer-readable memory device of claim 12, wherein said determining a preferred data center comprises:

determining the preferred data center in a frontend of the first datacenter; and wherein said redirecting the request to the preferred datacenter comprises:

redirecting the request to the preferred datacenter using binding redirection.

16. The computer-readable memory device of claim 12, wherein the consistency indicator is scoped to one of an application, a user or an organization.

17. The computer-readable memory device of claim 12, wherein the consistency indicator is scoped to an organization, and the consistency indicator further includes a scenario identifier.

18. The method of claim 2, wherein the hash function comprises a highest random weight hash function.

19. The distributed storage system of claim 8, wherein the hash function comprises a highest random weight hash function.

20. The computer-readable memory device of claim 13, wherein the hash function comprises a highest random weight hash function.

* * * * *